United States Patent [19]
Kensrue

[11] Patent Number: 6,064,036
[45] Date of Patent: May 16, 2000

[54] WELDING GUN FILLER WIRE SPOOL BRAKE AND WIRE POSITION REGULATOR

[75] Inventor: Milo M. Kensrue, Newport Beach, Calif.

[73] Assignee: MK Products, Inc., Irvine, Calif.

[21] Appl. No.: 09/156,222

[22] Filed: Sep. 18, 1998

[51] Int. Cl.[7] ....................................................... B23K 9/12
[52] U.S. Cl. ..................... 219/137.2; 219/137.7
[58] Field of Search ................................ 219/137.7, 136, 219/137.2

[56] References Cited

U.S. PATENT DOCUMENTS 3,143,633  8/1964  Wadleigh ............................. 219/137.7
4,885,453  12/1989  Martin .

FOREIGN PATENT DOCUMENTS 1159737  6/1985  U.S.S.R. .............................. 219/137.7

Primary Examiner—Clifford C. Shaw
Attorney, Agent, or Firm—Harold L. Jackson

[57] ABSTRACT

A brake and wire regulator for spools (22 or 40), which supply filler wire to an arc welding gun (10), includes a mounting plate (30 or 62) which is secured to a housing (12a, 12b) for the gun or to a remotely located wire supply housing (38) and a brake arm (32 or 58) having a proximal end pivotally mounted on the mounting plate with the distal end (32f or 58a) of the brake arm extending between the rim plates of the spool. A spring (38 or 64) extending between the mounting plate and the brake arm biases the distal end of the arm against the outer layer of wire on the spool to provide a braking action for the spool to prevent the wire from unspooling when the welding process ceases and impede migration of the outer most layer of wire across the spool.

22 Claims, 6 Drawing Sheets

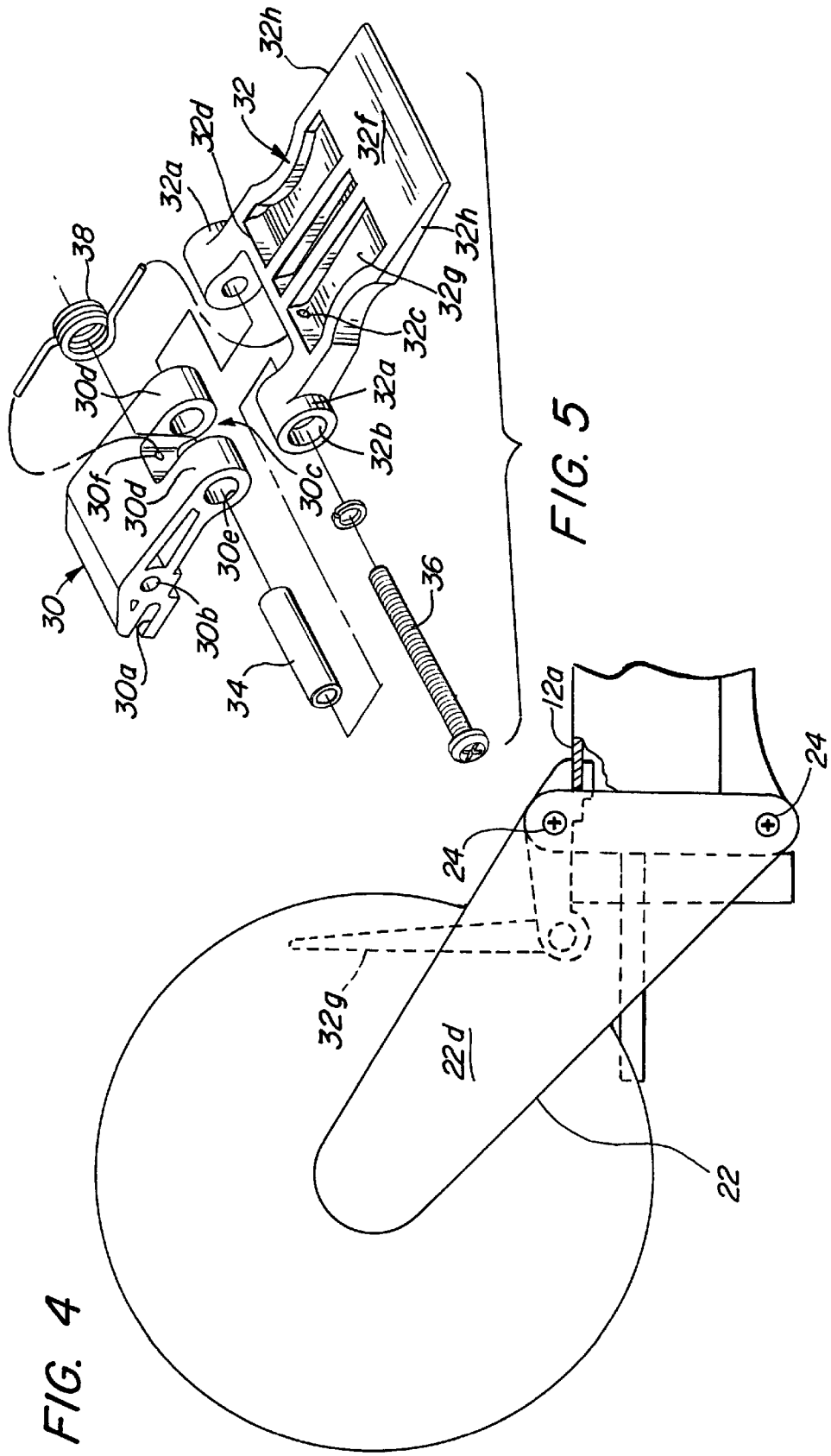

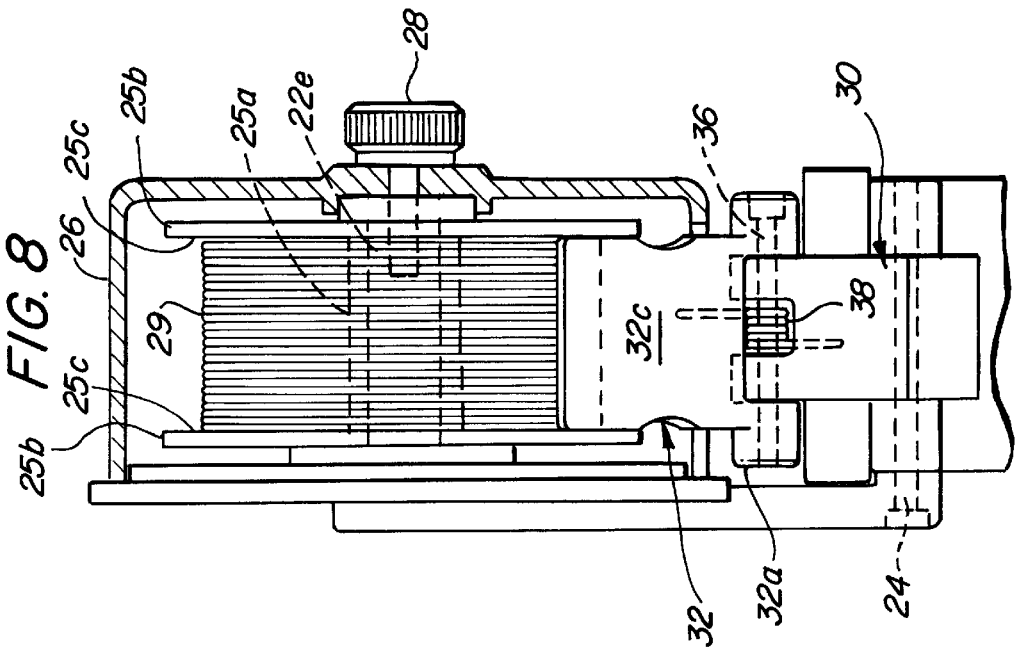
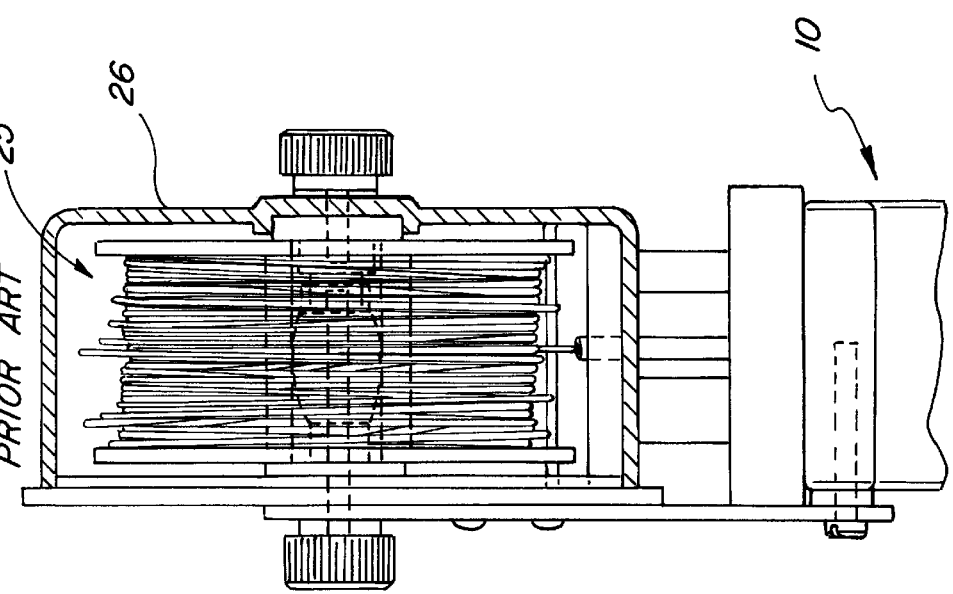

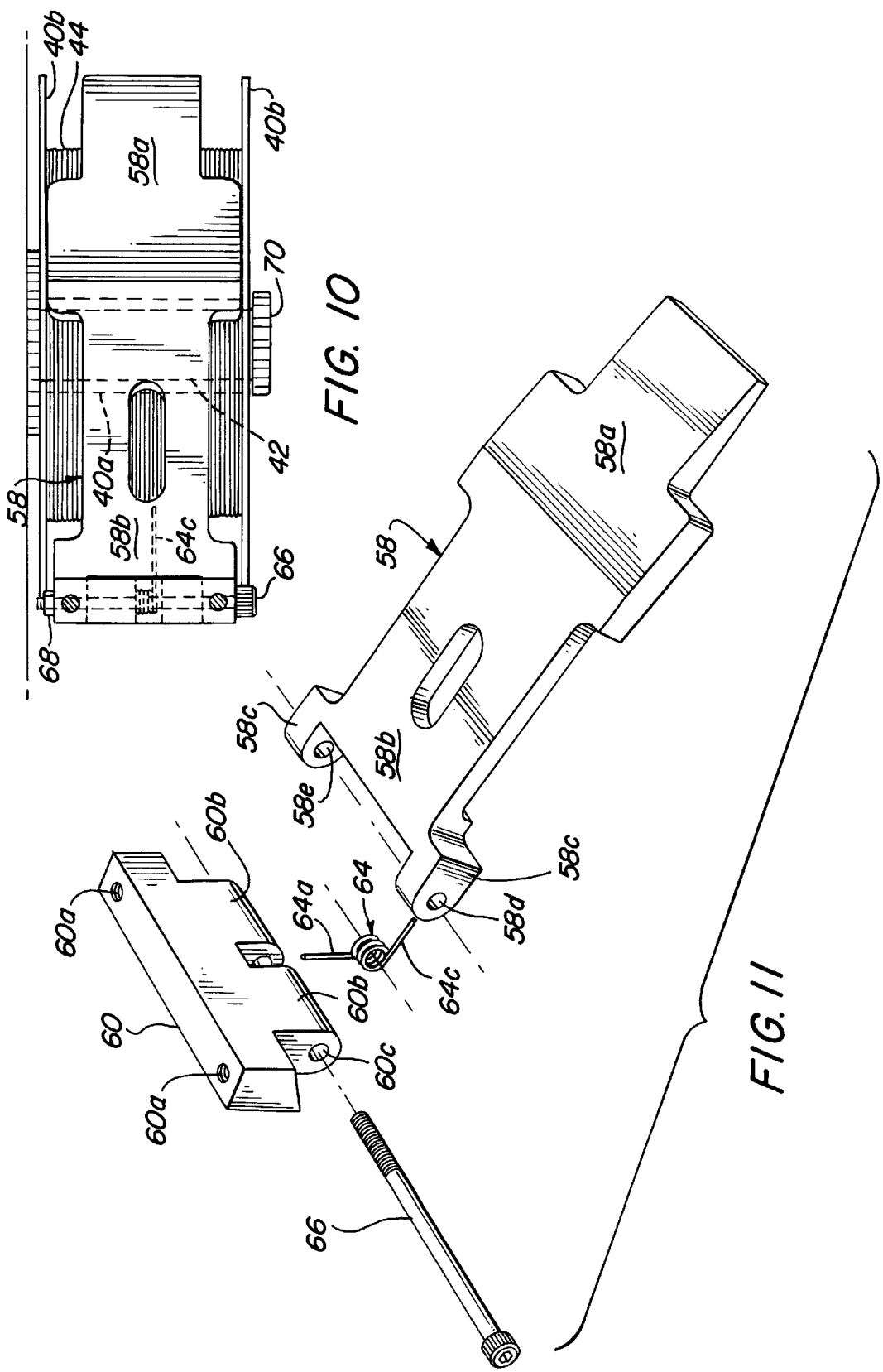

WELDING GUN FILLER WIRE SPOOL BRAKE AND WIRE POSITION REGULATOR

FIELD OF THE INVENTION

This invention relates to a spool brake mechanism and more particularly to a system for retarding the rotation of a filler wire spool used to feed filler material to a welding torch such as an arc welding head or gun.

DESCRIPTION OF THE PRIOR ART

In certain welding processes, a filler material, in the form of a coiled wire, such as steel or aluminum wire, is fed to a welding machine such as an arc welding gun. The wire filler material is typically fed to the welding site by motor driven rollers carried by the welding gun or by rollers mounted in a remote cabinet or both. When the welding ceases, the wire feed essentially stops immediately. To prevent the wire from unspooling (due to inertia), it is necessary to apply a braking or retarding force to the spool. In existing welding machines, the braking force is applied directly to the spool, by creating a frictional drag force (1) between a spindle, rotatably mounted with the spool and a stationary axle member or (2) between a spring biased torsion arm and a rim of the spool.

An example of the former spool braking system is described in U.S. Pat. No. 4,885,453 ("'453 patent") assigned to the assignee of this application. The '453 braking system is effective in stopping the rotation of the spool, but it is expensive to manufacture and must be readjusted after each spool replacement. An example of the latter brake is employed in a spool mechanism distributed by Miller Electric Mfg. Co. under the tradename Spoolmate. Both systems suffer from the disadvantage that the outer most rows of the spirally wound wire, which are next in line to be fed to the welding site, tend to migrate across the spool when wire is no longer being fed to the welding site. The result is an outer layer which is no longer organized in level rows and may become tangled as is illustrated in FIG. 4 of the accompanying drawings. When the wire becomes tangled it may, at best, present an excessive load to the wire feed motor or, at worst, break.

There is a need for a filler wire spool braking mechanism which not only serves to prevent the unspooling action, but in addition, serves to regulate the position of the wire by maintaining the wire in its original wound row pattern, i.e., level across the spool. In addition, the need exists for a spool braking mechanism which is reliable, inexpensive to manufacture and free from adjustment at the work site.

SUMMARY OF THE INVENTION

In accordance with the present invention, a spool brake and wire position regulator includes a frame or housing which may be separate from or formed integrally with the welding gun. A spindle rotatably mounts the spool on the frame. A brake arm has a proximal end mounted on the frame and a distal end biased into contact with the outermost layer of wire wound on the spool. The spool preferably is in the form of a hollow cylindrical drum with a rim plate extending radially outwardly at each end of the drum, the wire being spirally wound on the drum between the rim plates. The distal end of the brake arm preferably spans substantially the entire distance between the rim plates to make contact with substantially each row of the of outermost layer of wire on the spool.

The features and operation of the present invention may best be understood by the following description taken in conjunction with the accompanying drawings in which like components in the several figures are designated by the same reference numerals.

BRIEF DESCRIPTION OF THE DRAWINGS

FIG. 4 is a left side elevational view of the bracket mounted on the gun of FIG. 1 which receives the spool;

FIG. 5 is an exploded perspective view of the brake mechanism;

FIG. 7 is a front elevational view of a spool, equipped with a conventional spindle-type brake, illustrating how the wire on the spool can become disorganized after some wire has been pulled from the spool by the motor driven feed rollers;

FIG. 8 is a front elevational view of a spool equipped with a brake in accordance with this invention showing the condition of the wire after some wire has been fed to a welding site via the feed rollers.

FIG. 10 is a plan view of the brake mechanism taken along lines 10—10 of FIG. 9; and FIG. 11 is an exploded perspective view of the brake mechanism of FIG. 9.

DESCRIPTION OF THE PREFERRED EMBODIMENT

Figure 1:
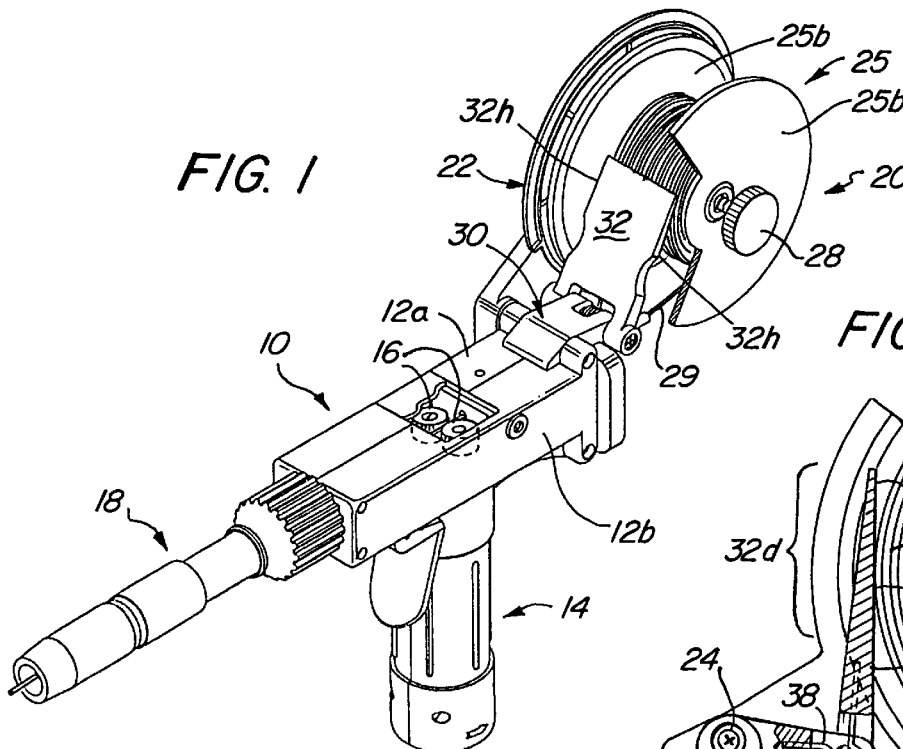
FIG. 1 is a perspective view of an arc welding gun with a filler wire spool and a brake and wire position regulator, in accordance with the present invention, mounted thereon.
Figure 3:
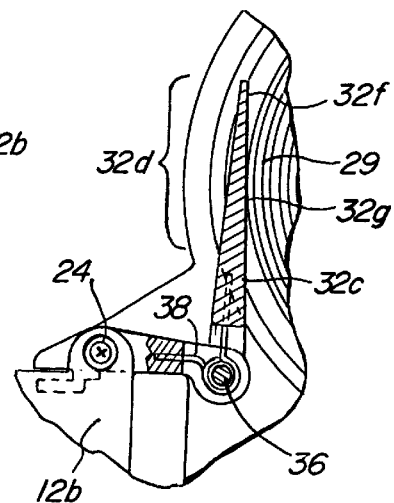
FIG. 3 is a partial cross-sectional view of the spool brake showing the spring which biases the braking arm against the spooled wire.

Referring now to the drawings, and more particularly to FIGS. 1–6, an arc welding gun 10, of the gas shielded type, includes a top section formed by split housing sections 12a and 12b and a cylindrical lower handle section 14 which houses a wire feed motor (not shown). A pair of wire feed rollers 16 feed filler wire through a nozzle 18 to a weld site (not shown) from a conventional spool 20 carried by a bracket 22 mounted to the gun housing via bolts 24. See FIGS. 2–4. A spool cover (shown in FIG. 6), generally inserted over the spool for safety reasons, is not shown in FIGS. 1–3 to enable the invention to be more clearly illustrated.

Figure 2:
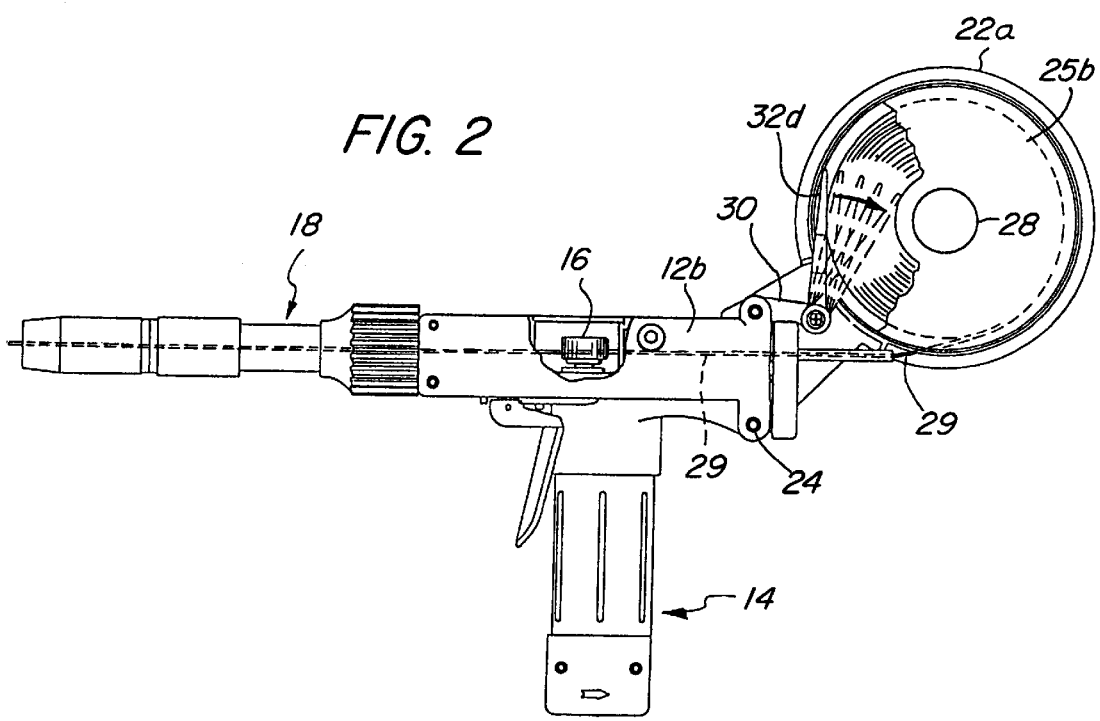
FIG. 2 is a side elevational view of the welding gun, spool and brake of FIG. 1 showing the braking arm as it bears against the outermost layer of the receding wire on the spool.
Figure 6:
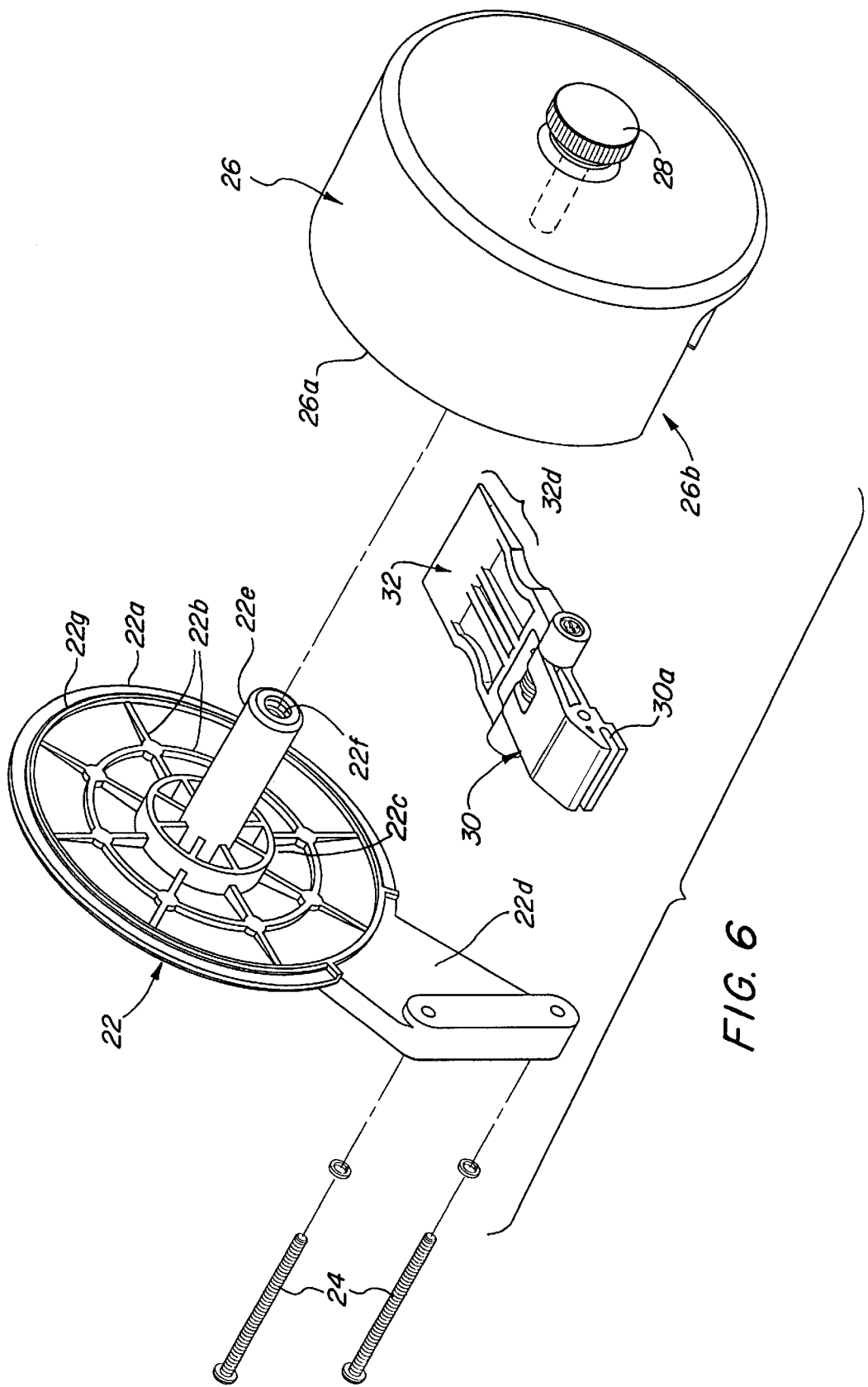
FIG. 6 is an exploded perspective view (right side) of the bracket which supports the spool, the brake mechanism and a spool cover.

The bracket 22 may be molded from a suitable plastic material and, as is illustrated in FIG. 6, includes a face plate 22a formed with reinforcing ribs 22b and an inwardly extending hub 22c which engages a rim plate of a spool 25 containing the filler wire as will be explained in more detail. See FIG. 6. The bracket 22 further includes a downwardly inclined mounting arm 22d, which is secured to the gun housing by the bolts 24, and a spindle 22e on which the spool is rotatably mounted. The wire is pulled by the feed rollers tangentially from the outer layer of wire on the spool in a direction generally perpendicular to the axis of the spindle as is illustrated in FIG. 2. The gun housing and bracket 22 are sometimes hereinafter referred to as a frame on which the braking mechanism of the present invention is mounted.

The spool cover referred to above is designated by reference number 26. The spool and cover are secured to the bracket via a bolt 28, with a knurled head, which is screwed into a threaded blind bore 22f in the free end of the spindle. The free peripheral edge 26a of the spool cover is arranged to seat over the annular rib 22g of the bracket, leaving an opening 26d, which spans the ends 22h of the ribs through which wire 29, drawn from the spool, passes to the gun and the motor driven feed rollers 16.

Referring now to FIG. 5, a spool brake and wire position regulator, in accordance with the present invention, includes a mounting plate 30 having a laterally extending slot 30a at one end which is received by the ends of the upper housing sections 12a and 12b as is best illustrated in FIG. 4. The mounting plate 30 is provided with a lateral bore 30b, through which the upper bolt 24 passes to firmly secure the mounting plate to the gun housing. The mounting plate further includes a U-shaped channel 30c formed by a pair of protruding end sections 30d which form a hinge joint with the cooperating proximal end sections 32a of a brake arm 32. The end sections 30d and 32a have holes 30e and 32b therethrough, respectively, which are coaxial when the brake is in its assembled condition.

A sleeve bearing 34 is seated within the left hand bore 32b, the bores 30e and abuts the inner wall of the left hand protruding end section 32a of the brake arm. A bolt 36 extends through the sleeve 34 and is screwed into the threaded bore 32b of the left hand section of the brake arm as is illustrated in FIG. 5. One end of torsion spring 36 is inserted into a blind bore 30f in the mounting plate while the other end extends through a hole 32c in a lateral rib 32d in the proximal end of the brake arm and abuts an outer face 32c of the brake arm. The spring biases the distal end 32f and in particular an inner face 32g thereof into contact with the outer most layer of wire on the spool 25. The biasing force will vary depending upon the spool weight and whether the wire is made of aluminum or steel. A biasing force of about 1 to 2 pounds has been found to be adequate to control various types and sizes of aluminum and steel wire (wound on a 4" spool) as the wire is fed to a welding site.

The spool 25, supplied by filler wire manufacturers, includes a hollow cylindrical drum 25a, on which the wire is wound, terminating in opposed rim plates 25b. See FIG. 8. The filler wire comes in different diameters, generally within the range of 0.030 to 0.062" for aluminum and 0.030 to 0.045" for steel.

The distal end of the brake arm preferably has a width about equal to 75% to 90% (or 95%) of the distance between the spool rim plates. Most preferably the distal end of the brake arm substantially spans the distance between the rim plates while leaving a sufficient clearance between the side edges 32h thereof and the inside faces 25c of the rim plates to eliminate any frictional engagement between the brake arm and the spool rim plates.

As is illustrated in FIGS. 1–4, the brake arm 32 can be readily rotated (counterclockwise in FIGS. 1–3) against the force of the spring by an operator to clear the spool rim plates to facilitate the replacement of spools.

As discussed previously, prior art braking mechanisms which apply a frictional force directly to the spool tend to allow strands of the wire to migrate across the spool when the pulling or tensile force is removed as a result of a cessation of the welding operation. Strands of the migrated wire have a tendency to uncoil and become tangled as is illustrated in FIG. 7. The braking mechanism of the present invention not only solves the uncoiling problem, but in addition, substantially maintains the wire in its original wound row patterns, i.e., level across the spool as is illustrated in FIG. 8.

Figure 9:
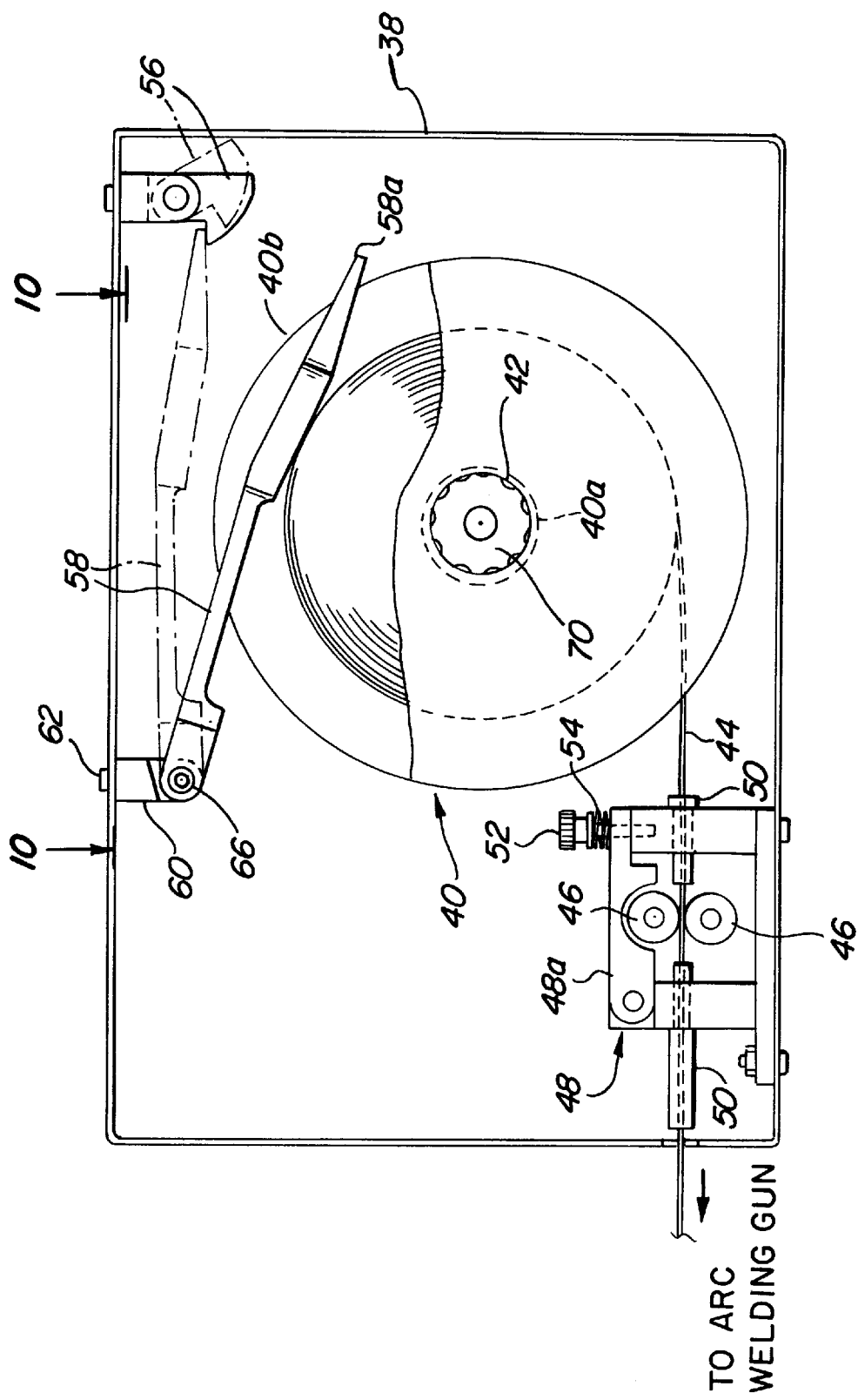
FIG. 9 is a side elevational view, partially broken away, of a spool brake and wire position regulator positioned in a cabinet which supplies filler wire to a remotely located arc welding gun.

The brake and wire position regulator of the present invention, as mounted in a filler wire feed housing or cabinet 38, remotely located from an arc welding gun, is illustrated in FIGS. 9–11. Referring particularly to FIG. 9, a spool 40 containing filler wire is rotatably mounted on a spindle 42 which in turn is suitably secured within the housing or cabinet, preferably via a bracket or frame member (not shown). A bolt 70 releasably holds the spool on the spindle. The spool, which is similar to the spool 25, but generally considerably larger (e.g., 12 inches), includes a hollow cylindrical drum 40a on which the wire 44 is wound and rim plates 40b. The wire 44 is pulled from the spool via wire feed rollers 46, with the bottom roller being driven by a motor (not shown). The feed rollers are mounted in a bracket 48 with the top (idler) roller secured to a pivot arm 48a to allow wire from a new spool to be inserted between the rollers and through tubular guides 50. A bolt 52 and spring 54 hold the arm 48a in place during the welding process. It should be noted that the remotely located welding gun may be equipped with additional wire feed rollers.

A spring loaded pawl 56, mounted to the housing 38, releasably retains the distal end 58a of a brake arm 58 clear of the spool rim plates to facilitate spool replacement. The proximal end 58b of the brake arm 58 in pivotally mounted to the housing via a mounting plate 60.

As is best illustrated in FIGS. 10 and 11, the mounting plate 60 includes tapped bores 60a into which bolts 62 are threaded to secure the plate to the upper wall of the housing. The mounting plate includes a pair of protruding end sections 60b with lateral bores therethrough which form a hinge joint with cooperating proximal end sections 58c of the brake arm. A torsion spring 64 has one end 64a extending within a blind bore of the mounting plate (not shown) between the end sections 60b. The other end 64c of the spring extends within a centrally located blind bore in the proximal end of the brake arm to bias the arm against the outermost layer of wire on the spool, as is illustrated in FIG. 9. In the assembled condition, bolt 66 extends through bore 58d of the brake arm, aligned bores 60c of the mounting plate, and the coil spring and is threaded into threaded bore 58e of the brake arm.

The in-cabinet-style brake arm 58 functions in the same manner as the gun-mounted brake arm 32 with the distal end thereof contacting the outermost layer of wire, as a result of the spring action, to brake the spool when the welding process ceases and to maintain the wire substantially in its original wound row pattern.

A novel weld filler wire spool brake and wire position regulator has been described. Various modifications of the disclosed braking mechanism, representing the preferred embodiment, will become apparent to those skilled in the art without involving any departure from the spirit and scope of the invention as defined by the appended claims.

What is claimed is:

1. In a welding apparatus which feeds filler material in the form of a wire to welding gun from a spool having a hollow cylindrical member terminating in a pair of rim plates, the wire being wound on the cylindrical member between the rim plates, the combination comprising:

a frame including a spindle for rotatably receiving the spool; and a braking member having a proximal end pivotally mounted to the frame and a distal end adapted to extend between the rim plates and contact the outermost layer of wire wound on the spool, the distal end of the braking member being biased against the outermost layer of wire to apply a retarding force to the spool and the wire wound thereon to maintain the wire in its original wound row pattern, level across the spool and to inhibit the wire from unspooling when the wire is no longer being fed to the welding gun.

2. The invention of claim 1 wherein the distal end of the braking member extends across at least about 75% of the width of the spooled wire between the rim plates of the spool.

3. The invention of claim 2 wherein the braking member includes a spring for biasing the distal end of the braking member against the outermost layer of wire wound on the spool.

4. The invention of claim 3 further including a mounting plate secured at one end to the frame, the distal end of the braking member being pivotally mounted to the other end of the mounting plate.

5. The invention of claim 4 wherein the spring is connected between the mounting plate and the braking member.

6. The invention of claim 5 wherein the braking member is generally in the shape of a paddle having a width at the distal end at least equal to about 85% to 95% of the distance between the rim plates of the spool.

7. The invention of claim 6 wherein the frame forms an integral part of the welding gun.

8. The invention of claim 6 wherein the frame forms part of a housing remotely located from the welding gun.

9. The invention of claim 6 wherein the distal end of the braking member substantially spans the distance between the rim plates.

10. In an arc welding apparatus in which a welding gun delivers wire filler material to a weld site via motor driven drive roll wheels which pull the wire from a spool releasably secured to the gun housing, the combination comprising:

a bracket secured at one end to the housing, the other end of the bracket extending generally rearwardly of the housing;

a spindle carried by said other end of the bracket for rotatably mounting the spool to the bracket; and a brake arm having a proximal end pivotally mounted to said housing of said bracket and a distal end biased into contact with the outermost layer of wire wound on the spool when the spool is mounted on the spindle, the brake arm applying a force against the outermost layer of wire to maintain the wire in its original wound row pattern and to inhibit the wire from unspooling when the wire is no longer being pulled from the spool.

11. The invention of claim 10 wherein the spool includes a hollow cylindrical drum on which the wire is wound, the drum terminating at each end in a rim plate which extends radially outwardly of the drum and wherein the distal end of the brake arm spans at least about 75% to 95% of the distance between the spool rim plates.

12. The invention of claim 11 further including a mounting plate secured on the housing at one end and forming a hinge joint with the proximal end of the brake arm.

13. The invention of claim 12 wherein the distal end of the brake arm is biased into contact with the wire by means of a spring.

14. The invention of claim 13 wherein the spring is of the coil type with two free ends, one of the ends being secured in the mounting plate and the other end engaging the brake arm.

15. The invention of claim 11 wherein the distal end of the brake arm substantially spans the entire distance between the rim plate to thereby make contact with substantially each row of the outer most layers of wire on the spool.

16. The invention of claim 15 further including a cup-shaped cover having a free end adapted to be placed over the spool and wherein the said other end of the bracket includes a circular plate from which the spindle protrudes, the circular plate defining a substantially annular rib for receiving the free end of the cover.

17. In a welding apparatus which delivers filler material in the form of a wire to a weld site via a drive mechanism which pulls the wire from a spool rotatably mounted on a spindle supported on a housing, the spool having a hollow cylindrical drum on which the wire is wound and a pair of rim plates, the improvement of a braking mechanism for retarding the rotation of the spool and regulating the position of the wire on the drum comprising:

a brake arm having a proximal end pivotally mounted on the housing and a distal end adapted to extend between the rim plates and contact the outermost layer of wire on the spool; and a spring having one end secured to the frame and another end positioned against the brake arm to bias the distal end thereof against the outermost layer of wire on the drum to maintain the wire in its original wound row pattern and prevent unspooling of the wire when the wire is no longer being pulled from the spool, the distal end of the brake arm being rotatable against the force of the spring to clear the rim plates of the spool to facilitate spool replacement.

18. The invention of claim 17 wherein the distal end of the brake arm extends about 75% to 95% of the distance between the rim plates.

19. The invention of claim 18 wherein the housing on which the spindle is supported also serves as a housing for an arc welding gun and further including a bracket secured to the housing and extending rearwardly thereof, the bracket carrying the spindle.

20. The invention of claim 18 wherein the distal end of the brake arm substantially spans the distance between the rim plates.

21. The invention of claim 20 wherein the housing is remotely located from the welding site.

22. The invention of claim 21 further including a spring biased pawl mounted on the housing for releasably holding the distal end of the brake arm away from the spool rim plates.

* * * * *